United States Patent [19]

Kosinski

[11] Patent Number: 5,086,096
[45] Date of Patent: Feb. 4, 1992

[54] POLYACETAL COMPOSITIONS STABILIZED WITH MICROCRYSTALLINE OR FIBROUS CELLULOSE

[75] Inventor: Leonard E. R. Kosinski, Washington, W. Va.

[73] Assignee: E. I. Du Pont de Nemours and Company, Wilmington, Del.

[21] Appl. No.: 536,369

[22] Filed: Jun. 11, 1990

Related U.S. Application Data

[63] Continuation-in-part of Ser. No. 483,603, Feb. 22, 1990, abandoned.

[51] Int. Cl.$^5$ .................. C08L 1/08; C08L 59/00
[52] U.S. Cl. .................. 524/36; 524/35; 524/377; 524/386; 524/387
[58] Field of Search ................ 524/35, 36, 377, 386, 524/387

[56] References Cited

U.S. PATENT DOCUMENTS

| | | | |
|---|---|---|---|
| 3,406,129 | 10/1968 | Price | 260/13 |
| 3,406,130 | 10/1968 | Neff | 260/13 |
| 3,406,131 | 10/1968 | Neff | 521/120 |
| 4,111,887 | 9/1978 | Shaner et al. | 260/37 AL |
| 4,766,168 | 8/1988 | West | 524/377 |
| 4,772,662 | 9/1988 | Collart et al. | 525/54.23 |

OTHER PUBLICATIONS

Co-pending U.S. patent application Ser. No. 07/327,664, filed Mar. 17, 1989–Novak.

*Primary Examiner*—Joseph L. Schofer
*Assistant Examiner*—Jeffrey T. Smith

[57] ABSTRACT

Incorporation of 0.05 to 5 weight percent of certain microcrystalline or fibrous cellulose polymers into polyacetal molding compositions results in improved thermal stability for such compositions.

18 Claims, No Drawings

POLYACETAL COMPOSITIONS STABILIZED WITH MICROCRYSTALLINE OR FIBROUS CELLULOSE

This is a continuation-in-part of co-pending application Ser. No. 07/483,603, filed Feb. 22, 1990, now abandoned.

BACKGROUND

1. Technical Field

This invention relates to certain polyacetal compositions which are characterized by improved stability and processing due to the inclusion therein of microcrystalline or fibrous cellulose, both of which are derived from naturally occurring cellulose and are non-melting at the temperature at which polyacetal is melt processed.

Polyacetal, also commonly referred to as polyoxymethylene, compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e. 10,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, in certain applications, it would be desirable to improve the thermal stability of the polyacetal composition. By the present invention, the thermal stability of polyacetal is improved through the use of either microcrystalline or fibrous cellulose as a stabilizer, both of which are naturally occurring materials and are non-melting at the temperature at which the polyacetal is melt processed.

2. Background Art

U.S. Pat. No. 4,766,168 discloses hydroxy-containing polymers or oligomers as stabilizers for polyacetal. Naturally occurring materials are not specifically mentioned in this reference as being stabilizers for polyacetal. Neither microcrystalline nor fibrous cellulose, both of which are non-melting at the melt processing temperature of polyacetal, are specifically disclosed within this reference, nor are the advantages obtained from the incorporation of microcrystalline or fibrous cellulose into polyacetal disclosed therein.

U.S. Pat. No. 4,722,662 discloses a process for manufacturing oxymethylene copolymers stabilized against thermal degradation, comprising the heating of the copolymer in an aqueous medium containing water and a disubstituted cellulose ether to hydrolyze unstable oxymethylene ends and then separating said oxymethylene copolymer from said aqueous medium containing a disubstituted cellulose ether. Disubstituted cellulose ethers are known thermoplastics.

U.S. Pat. No. 4,111,887 discloses polyoxymethylene molding compositions exhibiting improved physical properties comprising an admixture of a polyoxymethylene polymer, a fibrous reinforcement which can include cellulosic fiber, and a polycarbodiimide.

U.S. Pat. No. 3,406,129 discloses melt blends of moldable cellulose polymer having free hydroxyl groups with up to 50% of acetal polymer and U.S. Pat. No. 3,406,130 discloses colloidal dispersions of such blends with certain solvents for the cellulose polymer, which compositions are alleged to have improved melt strength and elongation. U.S. Pat. No. 3,406,129 specifically teaches that the use of greater than 50 weight percent polyacetal is detrimental to the melt blend. Further, the cellulose disclosed in these references is neither microcrystalline nor fibrous cellulose as it is moldable, and therefore, meltable at the melt processing temperature of polyacetal.

While some of the reference discussed above disclose incorporating certain particular cellulosics into polyacetal compositions, none disclose the specific types of cellulose used in the compositions of the present invention, nor do any disclose the unexpectedly improved stability in polyacetal compositions that results from the incorporation therein of said types of cellulose.

SUMMARY OF THE INVENTION

The present invention relates to polyacetal compositions stabilized with 0.05 to 5 weight percent of microcrystalline or fibrous cellulose, both of which are derived from naturally occurring cellulose and are non-melting at the temperature at which the polyacetal is melt processed. The resultant polyacetal compositions are characterized as having improved thermal stability over polyacetal alone and are useful in applications where polyacetal resin is used and where thermal stability in the polyacetal resin is desired.

DETAILED DESCRIPTION OF THE INVENTION

Polyacetals are known to be thermally unstable in the absence of stabilizing agents. To alleviate such problem, typical commercially available polyacetal compositions are stabilized with polyamide (such as disclosed in Alsup et al, U.S. Pat. No. 2,993,025). However, it has been found that polyamides can react with formaldehyde released during processing, resulting in the reaction products and/or decomposition products contaminating the molded article. As such, there exists a continuing need to develop effective and efficient stabilizers for polyacetal compositions.

This invention relates to certain polyacetal compositions which are characterized as having improved stability in comparison to polyacetal alone and to polyacetal compositions stabilized and melt compounded with conventional stabilizers. More specifically, it relates to polyacetal compositions that are stabilized with either microcrystalline or fibrous cellulose and that are characterized as having improved thermal stability, as measured by lower evolution of formaldehyde. Both the microcrystalline and fibrous cellulosics, which are derived from naturally occurring cellulose and which are non-melting at the temperature at which polyacetal is melt processed, used in the compositions of the present invention have been found to not degrade as readily as the conventional polyamide (or nylon) stabilizers.

To achieve the improvements mentioned above, i.e., lower evolution of formaldehyde, the compositions of the present invention consist essentially of (a) 0.05 to 5 weight percent microcrystalline cellulose or fibrous cellulose and (b) 95 to 99.95 weight percent polyacetal, with the weight percents being based upon the weight of component (a) and (b) only. Preferably, the compositions consist essentially of 0.05 to 2 weight percent component (a) and 98 to 99.95 weight percent component (b). Most preferably, the compositions consist essentially of (a) 0.05 to 1 weight percent component (a) and 99 to 99.95 weight percent component (b). All the above-mentioned weight percents are based upon the weight of components (a) and (b) only.

Component (b). Polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

Component (a). Microcrystalline or Fibrous Cellulose

The stabilizer used in the polyacetal compositions herein is microcrystalline cellulose or fibrous cellulose. Microcrystalline cellulose is preferred. Both microcrystalline cellulose and fibrous cellulose are derived from naturally occurring cellulose.

Microcrystalline cellulose is known in the art and is commercially available. It is described in detail in U.S. Pat. No. 3,023,104, incorporated herein by reference, and it is referred to therein as "cellulose crystallite aggregates". Microcrystalline cellulose is also described in "Hydrolysis and Crystallization of Cellulose", *Industrial and Engineering Chemistry*, vol. 42, 502-507 (1950).

Consistent with that which is taught in U.S. Pat. No. 3,023,104, the microcrystalline cellulose useful in the compositions of the present invention can be obtained from a commercial source or can be prepared by standard techniques of acid hydrolysis of naturally occurring cellulose. In either case, the microcrystalline cellulose should meet the purity requirements described below. In the acid hydrolysis of cellulose, the acid dissolves any amorphous portion of the original cellulose chains. The undissolved portion remaining from such hydrolysis is in a particulate, non-fibrous or crystalline form, said form being the result of the disruption of the continuity of the fine structures between the crystalline and amorphous regions of the original cellulose. The undissolved portion, which is in crystalline form, is known to be non-melting at the melt processing temperature of polyacetal. The melt processing temperature of polyacetal generally does not exceed 280° C. The methods of preparing microcrystalline cellulose by the acid hydrolysis of cellulose are known to those in the art and are, for example, described in U.S. Pat. No. 3,023,104, column 2 and the examples.

The microcrystalline cellulose used in the compositions of the present invention has a certain level-off degree of polymerization. Level-off degree of polymerization is described in U.S. Pat. No. 3,023,104. More specifically, it is described therein as being the point at which the cellulose that is subjected to acid hydrolysis reaches, after a certain period of time, a substantially constant molecular weight. In other words, it is the point at which the number of repeating units or monomers, sometimes designated anhydroglucose units, which make up the cellulosic material, becomes relatively constant. It is then apparent that the degree of polymerization of the material has leveled off, hence the name level-off degree of polymerization.

Consistent with what is disclosed in U.S. Pat. No. 3,023,104, the microcrystalline cellulose useful in the present compositions has a preferred average level-off degree of polymerization of 125 to 375 anhydroglucose units. Ideally, within this range all of the material should have the same degree of polymerization but as this is difficult, if not impossible, to achieve, it is preferred that at least 85% of the material have an actual degree of polymerization not less than 50 and not more than 550. More preferably, within the average level-off degree of polymerization of 125 to 375, at least 90% of the material should have an actual degree of polymerization within the range of 75 to 500, and it is still more preferred that at least 95% of the material has an actual degree of polymerization in the range of 75 to 450. The more preferred average level-off degree of polymerization for the microcrystalline cellulose useful herein is in the range of 200 to 300, of which material at least 90% has an actual degree of polymerization in the range of 75 to 550. The most preferred average level-off degree of polymerization for the microcrystalline cellulose useful herein ranges from 175 to 225.

As taught in U.S. Pat. No. 3,023,104, the microcrystalline cellulose will usually have an average particle size no greater than 300 microns. For purposes of this invention, the average particle size is the point at which 50% of the particles are greater than average and 50% of the particles are less than average. Average particle size can be determined by standard techniques, such as microscopic inspection, gravitational sedimentation, sieve analysis, and electron microscopy. The preferred method of determining particle size is gravitational sedimentation.

It has been found that, for the compositions of the present invention, stability increases as the average particle size of the microcrystalline cellulose decreases. As such, although microcrystalline cellulose can have an average particle size up to about 300 microns, it is preferred that the average particle size of the microcrystalline cellulose used herein be 100 microns or less, more preferably 50 microns or less, and even more preferably 25 microns or less, and most preferably 10 microns or less.

Fibrous cellulose is known in the art and is commercially available. It can be prepared from naturally occurring cellulose by techniques readily available to those skilled in the art. For example, a fibrous cellulose can be made by pulverizing wood pulp and then subsequently purifying it to meet the purity requirements described below. It is also a naturally occurring substance, an example of which is cotton linter. Fibrous cellulose generally exists in the form of flat ribbons. The width and thickness of these flat ribbons of fibrous cellulose is not considered critical in achieving the results exemplified herein. In general, however, the width of these flat ribbons will be, on average, approximately 25 microns and the thickness of these flat ribbons will be, on average, 6 microns. The length of the flat ribbons of the fibrous cellulose is also not considered critical in achieving the results exemplified herein. Fibrous cellulose is commercially available over a range of average fiber length, including from 300 microns down through less than 22 microns. Although average fiber length is not considered critical, it is expected that stability results will improve as average fiber length decreases due to the increase that such a decrease in average fiber length causes in the surface area of the fibrous cellulose stabilizer.

Another type of naturally occurring fibrous cellulose can be obtained from cellulose-producing bacteria, such as acetobacter and gluconobacter, via standard fermentation processes. After the fermentation process, the bacterial cells are destroyed via a hot caustic treatment and bacterial cellulose fibers are isolated by a series of washing and de-watering steps. The bacterial cellulose fibers that result can occur as intricately cross-linked networks or as distinct fibers. The thickness of the cellulose fibers produced by bacteria is typically about 0.1 microns.

It is important that the microcrystalline cellulose and the fibrous cellulose used in the compositions of the present invention be substantially free of compounds which destabilize acetal resins. Destabilizing impurities that are likely to occur in commercially available microcrystalline and fibrous cellulosics that are useful in the compositions of the present invention can be assayed via (1) the pH of an aqueous suspension of 1-10 weight percent microcrystalline cellulose or fibrous cellulose, (2) the non-volatile ash content, and/or (3) the heavy metal content.

More specifically, it is recommended that for optimum results, the pH of an aqueous suspension of 1-10 weight percent of the microcrystalline cellulose or fibrous cellulose useful in the compositions of the present invention be in the range of 5-7 for homopolymer polyacetal and in the range of 5-8 for copolymer polyacetal. It is more preferred that the pH of the suspension be in the range of 5-7 for both homopolymer and copolymer polyacetal. It is recommended that the non-volatile ash content (ashing is conducted at greater than or equal to 800° C.) of the microcrystalline cellulose or fibrous cellulose be less than 0.25%, more preferably less than 0.10%, and most preferably less than 0.02%. It is also recommended that the heavy metal content of the microcrystalline cellulose and the fibrous cellulose be less than 10 ppm. For maximum thermal stability results, it is recommended that the non-volatile ash content and the heavy metal content of the microcrystalline cellulose and the fibrous cellulose be minimized.

In stabilizing ester-capped or partially ester-capped polyacetal homopolymer, the microcrystalline and fibrous cellulose should be substantially free of basic materials which can destabilize the polyacetal. Basic impurities should preferably be removed to levels of not more than 200 ppm and most preferably to not more than 10 ppm, measured on a dry weight microcrystalline or fibrous cellulose basis. In stabilizing polyacetal copolymer or homopolymer that is substantially all ether-capped, higher concentrations of basic materials in the miorocrystalline and fibrous cellulose can be tolerated. In addition, it should be understood that if the impurity in the microcrystalline or fibrous cellulose is only weakly basic relatively higher amounts can be tolerated. In any event, the pH range of an aqueous suspension of the microcrystalline or fibrous cellulose used herein should be maintained within the range of 5-8 as described above.

In using microcrystalline or fibrous cellulose in stabilizing both homopolymer and copolymer polyacetal, acidic impurities in the microcrystalline and fibrous cellulose should be minimized. Acidic impurities should preferably be removed to levels of not more than 250 ppm and most preferably to not more than 10 ppm. As with the basic impurities, it should be understood that if the impurity in the microcrystalline or fibrous cellulose is only weakly acidic, relatively higher amounts can be tolerated. In any event, the pH range of an aqueous suspension of the microcrystalline or fibrous cellulose used herein should be maintained within the range of 5-8, as described above.

Accordingly, when such acidic and/or basic impurities are present in the microcrystalline or fibrous cellulose in amounts large enough to cause destabilization of the polyacetal compositions, the microcrystalline or fibrous cellulose should be purified before it is introduced into compositions of the present invention. Volatile impurities in the microcrystalline or fibrous cellulose can be removed by use of a vacuum oven. Non-volatile impurities in the microcrystalline or fibrous cellulose can be purified by washing or extracting the microcrystalline cellulose or fibrous cellulose with an appropriate liquid, such as, for example, water.

It should be understood that the compositions of the present invention can include, in addition to the polyacetal and the microcrystalline or fibrous cellulose, other ingredients, modifiers and additives as are generally used in polyacetal molding resins, including co-stabilizers, anti-oxidants, pigments, colorants, toughening agents, reinforcing agents, uv stabilizers, hindered amine stabilizers, nucleating agents, lubricants such as silicone oil and ethylene bis-stearamide, glass, polytetrafluoroethylene powder or fibers, and fillers. Preferred antioxidants include triethyleneglycolbis(3-(3'-tert-butyl-4'-hydroxy-5'-methylphenyl)proprionate, N,N'-hexamethylenebis(3,5-di-tert-butyl-4-hydroxyhydrocinnamide), and mixtures thereof. It should also be understood that some pigments and colorants can, themselves, adversely affect the stability of polyacetal compositions.

Preparation of the Compositions

The compositions of the present invention can be prepared by mixing the microcrystalline or fibrous cellulose stabilizer with the polyacetal at a temperature above the melting point of the polyacetal component of the compositions using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 185° C. to 240° C., and most preferably 195° C. to 225° C.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°–280° C., preferably 185°–240° C., most preferably 200°–230° C. When injection molding the compositions of the present invention, it is preferred that the mold be as cold as possible consistent with the intricacy of the shape being produced. Generally, the mold temperature will be 10°–120° C., preferably 10°–100° C., and most preferably about 50°–90° C.

EXAMPLES

In the following examples, there are shown specific embodiments of the present invention and certain comparisons with embodiments of control experiments outside the limits of the present invention. It will be seen that the compositions of the present invention are characterized by improved stability over that of polyacetal alone. All parts and percentages are by weight, and all temperatures are in degrees Celsius unless otherwise specified. Measurements not originally in SI units have been so converted and rounded where appropriate.

The polyacetals used in the examples below were as follows:

(a) POLYACETAL "A"—an acetate end-capped homopolymer having a number average molecular weight of about 40,000 and (b) POLYACETAL "B"—an acetate end-capped homopolymer having a number average molecular weight of about 33,000.

The microcrystalline cellulose stabilizers used in the examples below were as follows:

(a) "MC11" was a commercially available microcrystalline cellulose which was air jet milled to an average particle size of about 11 microns, (b) "MC20" was a commercially available microcrystalline cellulose having an average particle size of about 20 microns, (c) "MC50" was a commercially available microcrystalline cellulose having an average particle size of about 50 microns, and (d) "MC100" was a commercially available microcrystalline cellulose having an average particle size of about 100 microns.

The average level-off degree of polymerization for each microcrystalline cellulose used in the examples ranged from 190 to 200. Each microcrystalline cellulose used in the examples had less than 10 ppm heavy metals and less than 0.05% ash. The pH of a 10% aqueous suspension of each microcrystalline cellulose used in the examples ranged from about 5.5–7.

The fibrous cellulose used in the examples below were as follows:

(a) "FC1" was a commercially available fibrous cellulose having an average fiber length of less than 22 microns and an ash content of about 0.20% to 0.25% ash.

(b) "FC2" was a commercially available fibrous cellulose having an average fiber length of less than 90 microns, an ash content of about 0.15%, and a pH, measured on both 5% and 10% aqueous suspensions of cellulose, of 5.2, and (c) "FC3" was a commercially available fibrous cellulose having an average fiber length of about 300 microns, an ash content of about 0.16%, and a pH, measured on a 5% aqueous suspension of cellulose, of 5.95.

Stabilizers other than the above cellulose stabilizers that were used in the examples that follow were:

(a) "nylon" was a 33/23/43 terpolymer of nylon 66, nylon 6/10 and nylon 6, respectively and (b) "EVOH" was ethylene/vinyl alcohol copolymer containing 29 weight percent ethylene and 71 weight percent vinyl alcohol, and having an apparent melt viscosity at 210° C. of 9500 P, which had been purified such that it contained less than 10 ppm ash.

The antioxidants used in the examples that follow were:

(a) "antioxidant A" was triethyleneglycol bis(3-(3'-tert-butyl-4'-hydroxy-5'-methylphenyl)proprionate) and (b) "antioxidant B" was N,N'-hexamethylene bis(3,5-di-tert-butyl-4-hydroxyhydrocinnamide).

In the following examples, thermal stability of the compositions was determined using a thermally evolved formaldehyde (TEF) test procedure. A weighed sample of polyacetal composition was placed in a tube and the tube was fitted with a cap for introduction of nitrogen to the test sample for removal of any evolved gases from the apparatus while maintaining the sample in an oxygen-free environment. The sample was heated at either 250° C. or 259° C., as indicated in the data tables below, in a silicone oil bath. The nitrogen and any evolved gases transported thereby were bubbled through 75 ml of a 40 g/l sodium sulfite in water solution. Any evolved formaldehyde reacts with the sodium sulfite to liberate sodium hydroxide. The sodium hydroxide was continuously neutralized with standard 0.1N HCl. The results were obtained as a chart of ml of titer versus test time. The percent evolved formaldehyde was calculated by the formula $$(V)(N) \frac{0.03 \times 100}{SW}$$

where
V is the volume of titer in milliliters
N is the normality of the titer, and
SW is the sample weight in grams.
The factor "0.03" is the milliequivalent weight of formaldehyde in g/milliequivalent.

Thermally evolved formaldehyde results are reported in the data tables below under columns headed with "Wt % $CH_2O$ at x° C." The time period for which the sample was heated is also indicated in said data tables. The results obtained at the longer heating times are especially revealing of the improved long term stability of the compositions of the present invention.

EXAMPLES 1–13

Effect of Microcrystalline or Fibrous Cellulose on the Thermal Stability of Polyacetal Fluff The components of Examples 1–13 and Control Examples C1–C2 are listed in Table I, below. For each example, powdered microcrystalline cellulose or powdered fibrous cellulose stabilizer was added to polyacetal fluff, shaken to mix, and tested for thermally evolved formaldehyde ($CH_2O$) as described above. The results are reported in Table I, below. It is evident from the results that both the microcrystalline cellulose and the fibrous cellulose acted to improve the stability of the polyacetal.

TABLE I

EFFECT OF MICROCRYSTALLINE OR FIBROUS CELLULOSE IN POLYACETAL FLUFF

| Eg. No | Wt. % PAc | Wt. % Stabilizer | Wt % $CH_2O$ @ 250° C. | | |
|---|---|---|---|---|---|
| | | | 15 min | 30 min | 60 min |
| C1 | 100 A | — | 0.26 | 1.08 | 2.16 |
| 1 | 99.8 A | 0.2 MC20 | 0.29 | 0.69 | 1.12 |
| 2 | 99.5 A | 0.5 MC20 | 0.15 | 0.42 | 0.77 |
| 3 | 99.0 A | 1.0 MC20 | 0.11 | 0.36 | 0.69 |
| 4 | 98.0 A | 2.0 MC20 | 0.09 | 0.38 | 0.85 |
| 5 | 95.0 A | 5.0 MC20 | 0.09 | 0.64 | 1.17 |
| C2 | 100 B | — | 0.72 | 1.02 | 2.08 |
| 6 | 99.75 B | 0.25 MC20 | 0.38 | 0.28 | 0.68 |
| 7 | 99.5 B | 0.5 MC20 | 0.24 | 0.32 | 0.52 |
| 8 | 99.0 B | 1.0 MC20 | 0.24 | 0.26 | 0.54 |
| 9 | 98.0 B | 2.0 MC20 | 0.20 | 0.43 | 0.54 |
| 10 | 99.75 B | 0.25 FC1 | 0.38 | 0.64 | 0.92 |
| 11 | 99.5 B | 0.50 FC1 | 0.34 | 0.63 | 0.96 |
| 12 | 99.0 B | 1.0 FC1 | 0.35 | 2.22 | 1.34 |
| 13 | 98.0 B | 2.0 FC1 | 0.30 | 1.24 | 1.70 |

PAc = polyacetal

EXAMPLES 14–19

Effect of Microcrystalline Cellulose on the Thermal Stability of Polyacetal (Melt Processed)

The components of Examples 14–19 and Control Examples C3–C6 are listed in Table IIA and Table IIB, below. For each example, the components were mixed together and melt compounded on a 28 mm Werner and Pfleiderer twin screw extruder with barrel temperature settings of 150° C. to 180° C., die temperature setting of 200° C. and screw speed of 150 rpm. The temperature of the melt as it exited the die for the examples ranged from 221° C. to 224° C. The melt compounded sample was tested by the TEF test, described above. The results, as reported below in Table IIA and Table IIB, showed that the microcrystalline cellulose stabilizer imparted better thermal stability, on average, to polyacetal than did the conventional stabilizers at longer test times.

TABLE IIA

EFFECT OF MICROCRYSTALLINE CELLULOSE IN MELT PROCESSED POLYACETAL

| Eg. No. | Wt % PAc | Wt % Stab. | Wt % AO | Wt % $CH_2O$ @ 250° C. | | | | |
|---|---|---|---|---|---|---|---|---|
| | | | | 15 min | 30 min | 60 min | 120 min | 180 min |
| 14 | 99.4 A | 0.5 MC20 | 0.1 A | 0.15 | 0.60 | 1.21 | 2.19 | 3.08 |
| 15 | 99.4 A | 0.5 MC20 | 0.1 B | 0.18 | 0.55 | 1.09 | 1.95 | — |
| C3 | 98.9 A | 1.0 EVOH | 0.1 B | 0.20 | 0.78 | 1.96 | 4.60 | 6.84 |
| C4 | 98.9 A | 1.0 nylon | 0.1 A | 0.11 | 0.60 | 3.40 | 14.00 | 21.08 |

PAc = Polyacetal
Stab. = Stabilizer
AO = Antioxidant

TABLE IIB

EFFECT OF MICROCRYSTALLINE CELLULOSE IN MELT PROCESSED POLYACETAL

| Eg. No. | Wt % PAc | Wt % Stabilizer | Wt % AO | Wt % $CH_2O$ @ 259° C. | |
|---|---|---|---|---|---|
| | | | | 15 min | 30 min |
| 16 | 98.9 A | 1.0 MC11 | 0.1 B | 0.15 | 0.63 |
| 17 | 99.65 A | 0.25 MC11 | 0.1 B | 0.21 | 0.74 |
| 18 | 99.4 A | 0.5 MC11 | 0.1 B | 0.27 | 0.87 |
| 19 | 99.4 A | 0.5 MC20 | 0.1 B | 0.20 | 0.66 |
| C5 | 99.7 A | 0.2 EVOH | 0.1 B | 0.18 | 0.99 |
| C6 | 98.9 A | 1.0 EVOH | 0.1 B | 0.07 | 0.52 |

PAc = polyacetal
AO = antioxidant

EXAMPLE 20 AND C8

Effect of Fibrous Cellulose on the Thermal Stability of Polyacetal (Melt Processed)

The components of Example 20 and Control Examples C7–C8 are listed in TABLE III, below. For each example, the components were mixed together, melt compounded, and extruded under the same conditions as for examples 14–19. Each sample was subjected to the TEF test, described above.

The results are reported in TABLE III, below. Control Example C8 shows the type of results obtained when an impure fibrous cellulose (pH less than 5.5) was added to the polyacetal.

TABLE III

EFFECT OF FIBROUS CELLULOSE IN MELT PROCESSED POLYACETAL

| Eg. No. | Wt % PAc | Wt % Stabilizer | Wt % AO | Wt % CH$_2$O @ 259° C. 15 min | 30 min |
|---|---|---|---|---|---|
| 20 | 94.90 B | 5.0 FC3 | 0.10 B | 0.03 | 0.27 |
| C7 | 99.1 B | 0.8 EVOH | 0.10 B | 0.06 | 0.47 |
| C8 | 94.90 B | 5.0 FC2 | 0.10 B | 0.68 | 3.49 |

PAc = polyacetal
AO = antioxidant

EXAMPLES 21-26

Polyacetal with Microcrystalline Cellulose of Varying Particle Size

The components of Examples 21-26 and Control Example C9 are listed in Tables IVA and IVB, below. The components were mixed together and melt compounded as described for Examples 14-19. Each sample was subjected to the TEF test, described above.

The results for Examples 21-23 are reported in Table IVA, below. The results showed that as the average particle size of the microcrystalline cellulose decreased, the thermal stability of the polyacetal composition increased.

The results of Examples 21-23 are reported in Table IVB, below. For these examples, TEF values were obtained at test times longer than 30 minutes. The results showed again that the smaller the average particle size of the microcrystalline cellulose, the better the thermal stability of the polyacetal.

TABLE IVA

POLYACETAL WITH MICROCRYSTALLINE CELLULOSE OF VARYING PARTICLE SIZE

| Eg. No. | Wt % PAc | Wt % Microcrystalline Cellulose | Microcrystalline Cellulose Average Particle Size (Microns) | Wt % AO | Wt % CH$_2$O @ 259° C. 15 min | 30 min |
|---|---|---|---|---|---|---|
| 21 | 99.4 A | 0.5 MC100 | 100 | 0.1 A | 0.26 | 1.20 |
| 22 | 99.4 A | 0.5 MC50 | 50 | 0.1 A | 0.32 | 1.07 |
| 23 | 99.4 A | 0.5 MC20 | 20 | 0.1 A | 0.13 | 0.53 |

PAc = polyacetal

TABLE IVB

POLYACETAL WITH MICROCRYSTALLINE CELLULOSE AT VARYING AVERAGE PARTICLE SIZE

| Eg. No. | Wt % PAc | Wt % Stabilizer | Microcrystalline Cellulose Average Particle Size (microns) | Wt % AO | Wt % CH$_2$O @ 250° C. 15 min | 30 min | 60 min | 90 min | 120 min |
|---|---|---|---|---|---|---|---|---|---|
| 24 | 99.4 A | 0.5 MC100 | 100 | 0.1 B | 0.18 | 0.86 | 2.24 | 3.32 | 4.57 |
| 25 | 99.4 A | 0.5 MC50 | 50 | 0.1 B | 0.19 | 0.63 | 1.11 | 1.50 | 1.86 |
| 26 | 99.4 A | 0.5 MC20 | 20 | 0.1 B | 0.18 | 0.55 | 1.09 | 1.54 | 1.95 |
| C9 | 99.15 A | 0.75 EVOH | — | 0.1 B | 0.11 | 1.98 | 2.86 | 3.67 | 4.61 |

PAc = polyacetal

I claim:

1. A thermoplastic polyacetal composition consisting essentially of
   (a) 0.05 to 5 weight percent of a stabilizer selected from the group consisting of microcrystalline cellulose and fibrous cellulose, and
   (b) 95 to 99.95 weight percent of polyacetal,
provided that the above-stated percentages are based on the total amount of components (a) and (b) only and wherein the average particle size of the microcrystalline cellulose is 100 microns or less.

2. The composition of claim 1 wherein the component (a) stabilizer is substantially free of acidic materials.

3. The composition, of claim 1 wherein the component (b) polyacetal is a homopolymer and the component (a) stabilizer is substantially free of acidic materials and basic materials.

4. The composition of claims 1, 2 or 3 wherein component (a) comprises 0.05 to 2 weight percent of the composition.

5. The composition of claims 1,2 or 3 wherein component (a) comprises 0.05 to 1 weight percent of the composition.

6. The composition of claim 1 wherein the component (a) stabilizer is microcrystalline cellulose.

7. The composition of claim 6 wherein the average particle size of the microcrystalline cellulose is 50 microns or less.

8. The composition of claim 6 wherein the average particle size of the microcrystalline cellulose is 25 microns or less.

9. The composition of claim 6 wherein the average particle size of the microcrystalline cellulose is about 10 microns or less.

10. The composition of claim 6 wherein the microcrystalline cellulose has a level off degree of polymerization of 125 to 375 anhydroglucose units.

11. The composition of claim 6 wherein the microcrystalline cellulose has a level off degree of polymerization of 175 to 225 anhydroglucose units.

12. The composition of claim 1 wherein the component (a) stabilizer is fibrous cellulose.

13. The composition of claim 12 wherein the fibrous cellulose is obtained from cellulose-producing bacteria.

14. The composition of claims 1 or 2 wherein the component (b) polyacetal is a copolymer.

15. The composition of claims 1, 2, or 3 wherein the component (b) polyacetal has a number average molecular weight of 10,000-100,000.

16. The composition of claims 1, 2, or 3 further comprising at least one of co-stabilizers, antioxidants, colorants, reinforcing agents, UV stabilizers, hindered amine stabilizers, nucleating agents, lubricants, toughening agents, and fillers.

17. Shaped articles made from the composition of claims 1, 2, or 3.

18. A method of preparing the composition of claims 1 comprising mixing the stabilizer with the polyacetal at a temperature above the melting (point of the polyacetal and below the temperature at which degradation of the components will occur.

* * * * *